Dec. 5, 1961 K. N. BURNS 3,012,234

NOISE REDUCTION IN PULSE-WIDTH MODULATED RECORDING

Filed Jan. 16, 1958

Kay Neil Burns Inventor

Attorney James A. Reilly 3,012,234
Patented Dec. 5, 1961

3,012,234

NOISE REDUCTION IN PULSE-WIDTH MODULATED RECORDING

Kay N. Burns, Tulsa, Okla., assignor, by mesne assignments, to Jersey Production Research Company Filed Jan. 16, 1958, Ser. No. 709,332
4 Claims. (Cl. 340—174.1)

Figure 1:
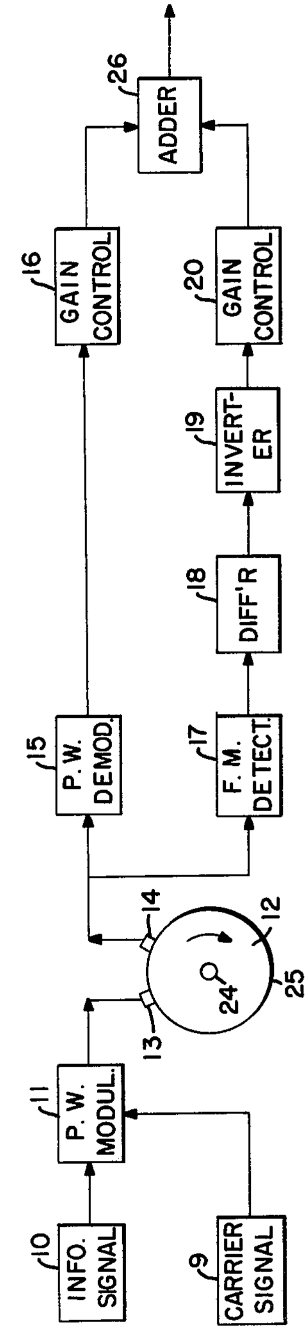

The present invention pertains to an improvement in the art of reproducibly recording pulse-duration modulated signals. The invention more particularly concerns a system for reducing the amount of "noise" which may accompany the recording and reproducing of such signals. The invention especially pertains to an improved system for reproducing an information signal which has been used to duration-modulate a pulsing carrier signal, the resulting modulated signal thereafter being recorded on a reproducible-type recording medium. The invention is especially characterized by its ability to free the reproduced signal from noise occasioned by velocity variations in the recording and/or reproducing process.

It is a well-known practice to record an electrical signal in the form of a trace on a reproducible recording medium. In general, the signal is transmitted to a suitable recording head or device; and a linear rate of movement is generated between the head and the medium so as to form the trace on the medium. Reproduction or playback of the trace is achieved by scanning it with a suitable pickup head which in some instances may be identical with the recording head. Reproducible-type recording media include magnetic-type media such as wire and tape; and photographic-type media such as black-and-white film and color film.

It is also a well-known practice in reproducible recording to use various types of modulation to record an electrical information signal rather than a direct recording process. In general, the information signal (of relatively low frequency) is caused to modulate a characteristic of a relatively high-frequency carrier signal; and the resulting modulated signal is thereafter recorded on a reproducible recording medium. Frequency modulation, phase modulation, and pulse-duration or pulse-width modulation have been especially well received for this purpose.

As mentioned above, a modulated carrier signal is recorded as a trace on a reproducible recording medium by supplying the signal to a suitable recording head and simultaneously effecting movement between the head and the medium. It is essential that the rate of movement (i.e., recording velocity) be kept as constant as possible; otherwise, spurious signals in the form of "noise" may be introduced within the recorded signal. Frequency-modulated systems are especially prone to this type of noise, the amount of noise being directly related to variations in the recording velocity. Similar noise signals are caused during reproduction by variations in the reproducing velocity.

Pulse-duration modulation (or pulse-width modulation, as it is oftentimes called) is much less susceptible than frequency modulation to noise caused by velocity variations. Thus, noise in a pulse-width or pulse-duration modulation recording system is associated with rates of change in the velocity of a recording or reproducing process rather than the changes themselves. In other words, while pulse-duration modulated systems may be subject to velocity-variation noise, the amount of noise is much less pronounced than with frequency-modulated systems.

In spite of the reduced noise level in pulse-duration modulated recording systems as compared to frequency-modulated systems, it is eminently desirable to reduce this extent of noise still further. It is, accordingly, a primary object of this invention to provide an improved type of recording and reproducing system using pulse-duration modulation, wherein improved noise reduction is realized.

A previous solution to the noise problem in recording modulated signals has been to record simultaneously with the modulated carrier signal a constant-frequency reference signal which may conveniently be the unmodulated carrier signal itself. In principle, the modulated signal and the reference signal should both undergo the same frequency variations during recording and reproducing. Accordingly, when the two signals are ultimately reproduced, they may be demodulated and subtracted from one another so as to cancel at least a portion of the noise.

The above method, while sound in principle, has the distinct disadvantage of requiring an additional recording channel for the reference signal. Furthermore, in a multi-channel recording system where a single such reference channel is usually recorded along with a plurality of information signal channels, it is necessary to assume that speed variations are identical for all of the channels. This, unfortunately, is not always a safe assumption to make. For example, in the case where a plurality of signals are being recorded simultaneously as separate channels on a magnetic tape recording medium, it has been found that tape "squirm" can cause substantial velocity variations between the individual channels. This condition tends to be especially prevalent in seismic recording where the output "seismic" signals from a spread of seismic detectors in a seismic observation are recorded along a length of magnetic tape. In a popular form of seismic recording apparatus, the magnetic tape is wrapped around the surface of a rotatable drum; and one or more banks of magnetic heads (a separate head being used for each seismic detector station) are mounted adjacent the tape to record the seismic signals. The heads are arranged to record the signals in side-by-side channels which extend along the tape. While every precaution is generally taken to prevent velocity variations in recording the various channels, it has nevertheless been found that tape squirm, drum vibrations, head vibrations, and the like may cause substantial channel-to-channel noise differences.

In view of the noise problem that particularly confronts multi-channel reproducible seismic recording systems, it is a further object of this invention to improve such systems so as to greatly reduce channel-to-channel noise differences. More particularly, it is an object of the invention to provide an improved type of seismic recording system in which any speed-variation noise associated with the recording and/or reproducing of any signal channel is reduced without the necessity for recording a reference signal such as the unmodulated carrier.

These and related objects of the invention, which will be expressly discussed or readily apparent in the following description, are realized in accordance with one embodiment of the invention by employing two types of signal-detection systems during the reproduction of each recorded channel of information. The invention requires that each information signal (viz., a seismic signal from a geophone station) be used to duration-modulate the pulses of a constant-frequency pulsing carrier signal and that the modulated carrier signal be then recorded in a conventional manner along a channel of a reproducible recording medium. As in conventional pulse-duration modulation systems, one edge of each pulse in the pulsing carrier signal should be formed at a substantially constant frequency so that successive fixed edges are equally spaced in time. The remaining edge of each pulse is variable in position relative to the fixed edge, depending upon the magnitude and sign of the modulating or information signal. Thus, in a preferred form of the invention, the leading edge of each pulse is the fixed edge; and the trailing edge is varied in its position in response to the modulating signal. It is further preferred that the trailing edge be positioned midway between adjacent fixed edges when the modulating signal has a neutral or zero voltage, and that the position of the trailing edge be then varied toward one or the other of the leading edges in response to the character of the modulating signal.

Once an information signal has been used to pulse-width modulate a carrier signal, and once the modulated signal has been recorded as a trace along a reproducible recording medium, the invention reproduces the trace by applying two types of signal detection to the trace. A first detector employing pulse-width detection is applied to the trace so as to determine the pulse-width modulated carrier and thereby recover the original information signal plus any noise due to velocity variations. Simultaneously, a frequency-modulation detector is applied to the trace to detect any apparent frequency variations in the carrier signal itself. Thus, the FM detector—which may be any one of a number of conventional types—is adapted to detect any apparent variations in the frequency of the reference points (i.e., the fixed edges) of the individual pulses in the carrier. Any such variations cause the FM detector to detect a "noise" signal. Since this noise signal, however, is one caused by variations in velocity rather than rates of change in velocity, it is necessary to differentiate the signal value to obtain the noise signal whose value is the one actually sought. The latter signal is then subtracted from the information signal output of the pulse-width detector. The signal resulting from this subtraction is the information signal corrected for noise caused by frequency variations in the recording and/or reproducing process.

The embodiment of the invention just discussed may be better understood by reference to FIGURE 1 which illustrates in block diagram how the embodiment may be applied to a multi-channel magnetic-type seismic recording system.

Figure 2:
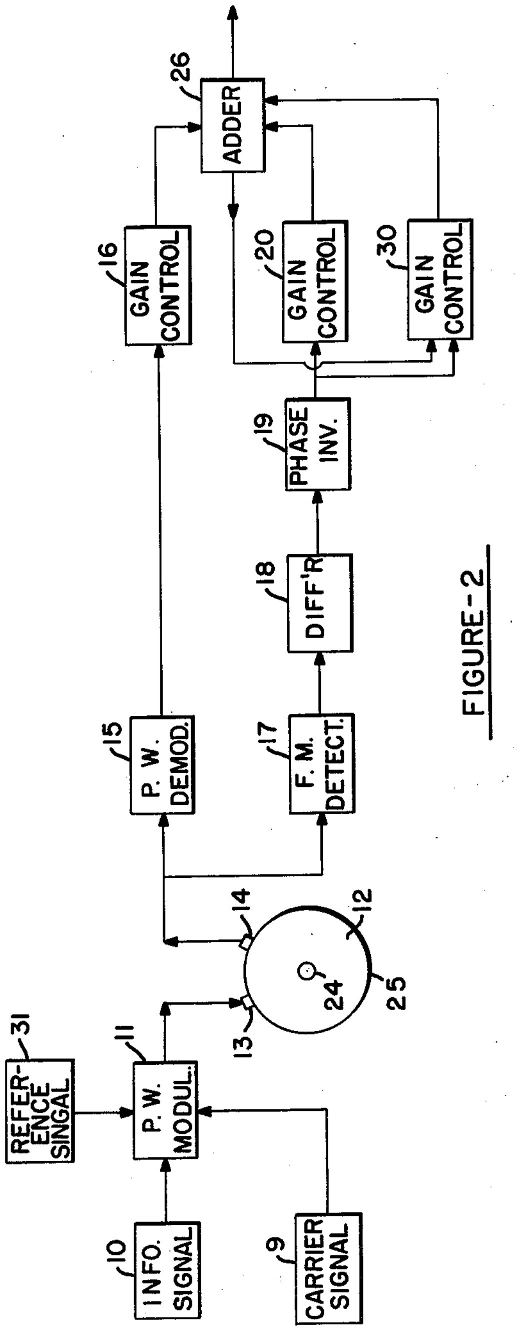

FIGURE 2 illustrates how another embodiment of the invention may be applied to a multi-channel magnetic-type seismic recording system. The nature of this embodiment will be considered later in this description.

Both FIGURE 1 and FIGURE 2, it will be noted, illustrate how merely one channel of information is handled in accordance with the invention. In an actual seismic recorder, upwards of thirty or more such channels of information may be simultaneously processed. One of the channels is generally reserved for recording of the shot time, another for a reference timing signal, and one for each seismic detector station. The figures, then, are intended to illustrate primarily how the signal from any one of the detector stations is recorded and subsequently reproduced by different embodiments of this invention.

Turning to FIGURE 1, there is illustrated a rotatable drum 12 of a seismic recording apparatus. The drum is rotated through shaft 24 by means of a suitable electric motor or other power source, not shown, which operates at substantially constant speed. The cylindrical surface of drum 12 is covered with a reproducible recording medium 25—in this instance, a length of magnetic tape. Magnetic recording head 13 and reproducing head 14 are mounted adjacent tape 25 and are adapted to record and reproduce a channel or trace of information on the tape.

The signal source 10, as mentioned earlier, is in this instance a seismic detector of a character to generate an electrical transient in response to the reception of seismic energy. The signal from source 10 is applied to pulse-width modulator 11, where it modulates the pulse of a constant-frequency, constant-amplitude carrier signal. The carrier signal is supplied from source 9 and may be generated in any suitable manner and by conventional means.

The modulated signal from modulator network 11 is applied to recording head 13 which forms a trace recording of the signal along the tape 25 upon rotation of drum 12. Simultaneous with, or subsequent to, the recording process, reproducing head 14 plays back the trace recorded by head 13; and it transmits the resulting signal to the detectors 15 and 17. Detector 15 is preselected to be of a character adapted to demodulate the pulse-width modulated signal reproduced by head 14. The original information signal generated from source 10 is thereby recovered and appears as an output signal from detector 15. This output signal, of course, may contain noise caused by velocity variations in the recording and/or reproducing steps.

Detector network 17, as described earlier, is a frequency-modulation detector and is adapted to detect apparent velocity changes in the recording and/or reproducing steps through the detection of changes in the repetition rate of the fixed edges of the pulses in the modulated carrier signal. Detector 17 may conveniently be an FM discriminator.

The output from detector 17 is supplied to a conventional differentiator network 18 in which the first derivative of the output signal is obtained. The output from the differentiator, in turn, is transmitted to a phase inverter 19 so that the algebraic sign of the derivative signal may be made opposite to that of the output signal from detector 15. The inverted signal is then passed to a gain-adjusting network 20, where its amplitude has been made compatible with the signal from detector 15, as will be explained later. The amplitude of the latter signal may also be adjusted as desired in a gain-control network 16. In any event, the two signals—once compatible—are combined in a conventional adder network 26 to reproduce the original information signal, reduced in its noise level. The output signal may be conducted to any suitable recording or display device as desired for further study, observation, or the like.

In employing the apparatus shown in FIGURE 1, it will be recognized that some preadjustment of the system will generally be necessary before it may be used in the practice of this invention. Thus, it will be generally desirable to precalibrate each recording channel for noise correction. This may be conveniently done, for example, by recording and reproducing an unmodulated carrier signal on the surface 25 and intentionally jarring or otherwise disturbing the velocity of the drum 12 so as to introduce noise in the recording and/or reproducing process. In the absence of any modulating signal from the source 10, and in the further absence of any jarring or other disturbance of the recording equipment, the signal output of the adder 26 should be substantially nil. Jarring or otherwise intentionally disturbing the velocity of drum 25, however, will cause velocity variations to occur which in turn will cause adder 26 to produce an output signal—provided the two signals supplied to the adder are not properly adjusted. Adjustment to obtain a zero signal under such conditions is readily obtained by simply adjusting the relative gains of the two signals. Thus, one or both of the gain-control networks 16 and 20 may be varied under these conditions until the adder output is zero. The apparatus is then ready for signal-recording purposes.

The foregoing embodiment of the invention and the embodiment shown in FIGURE 2 differ somewhat in the extent to which the velocity-variation noise in a reproducible recording system may be reduced. Generally stated, the system of FIGURE 1 will usually provide sufficient noise reduction for virtually all conventional recording systems and processes. However, where further noise reduction is desirable, it is contemplated that the embodiment shown in FIGURE 2 may be employed to advantage.

The differences between the embodiments in FIGURES 1 and 2 may be better understood by the following mathematical analysis. This analysis will also be helpful in further understanding the nature of the overall invention itself. The analysis is not necessarily complete in its treatment of the velocity-variation noise problem in reproducible recording, but it has aided considerably in the approach to this problem. The analysis is based upon the understanding that the degree of modulation at any instant in a pulse-duration modulated recording and/or reproducing system is proportional in effect to the ratio "R" of the time interval between a fixed edge of a pulse and the next variable edge to the time interval between the same fixed edge and the next fixed edge. Thus, in a system where the variable edge is placed exactly between two fixed edges for an effectively zero modulating voltage, zero modulation occurs at this point. Modulation other than zero causes the variable edge to be displaced toward one or other of the adjacent fixed edges so as to change the value of the aforementioned time ratio by an incremental value here designated as "ΔR."

Since, as mentioned earlier, the signal recorded or reproduced in a pulse-duration modulated system is affected by rates of changes in the velocity of recording or reproducing, the magnitude of the signal at each instant may be expressed by the following equation:

$$S=(R+\Delta R)\frac{d}{dt}(v+\Delta v) \qquad (1)$$

where "R" and "ΔR" are the ratio values above; "$t$" is time; "$v$" is the desired constant recording or reproducing velocity; "$\Delta v$" is any velocity variation; and "S" is the composite signal produced by the terms—all terms being in consistent units.

Upon performing the mathematical operations indicated above, the following equation is obtained:

$$S=(R+\Delta R)\left(K+\frac{d\Delta v}{dt}\right) \qquad (2)$$

where "K" is a constant; and then:

$$S=RK+\Delta RK+R\frac{d(\Delta v)}{dt}+\Delta R\frac{d(\Delta v)}{dt} \qquad (3)$$

The term "RK," it will be apparent, is essentially a D.C. signal and is of no ultimate consequence in the recording and reproducing process. It may be eliminated readily as by means of a coupling condenser. The term "ΔRK" represents the extent of intentional modulation present at any instant and harbors the value of the information signal.

The last two terms are noise values. The first of these two terms is generally much the larger, and it is specifically reduced by all embodiments of this invention. The second of the two terms may also be eliminated, if desired, by an embodiment of the nature shown in FIGURE 2. Expressed otherwise, the embodiment of FIGURE 1 is capable of reducing noise of the type expressed by the term $$R\frac{d(\Delta v)}{dt}$$

while the embodiment of FIGURE 2 is capable of reducing this noise plus the noise expressed by the term $$\Delta R\frac{d(\Delta v)}{dt}$$

Turning to FIGURE 2, it will be seen that the system shown there is identical with that of FIGURE 1 except for a feedback network including gain-control network or losser circuit 30. Losser circuit 30 receives an input signal from phase inverter 19 and a feedback signal from adder 26 as indicated; and it is preselected such that its output varies substantially linearly with the output voltage of adder 26.

Losser circuit 30, like gain-control network 16 and/or network 20, should be precalibrated or zero-adjusted before applying any signal from source 10. Precalibration of circuit 30, however, should also be made following precalibration of networks 16 and/or 20. Thus, as explained earlier, network 16 and/or network 20 should be preadjusted first such that adder 26 produces a zero output voltage when a carrier signal from source 9 is recorded and reproduced from surface 25 in the absence of a modulating voltage and in the presence of intentional variations in the velocity of drum 12—viz., jarring or otherwise disturbing the drum. Then, a reference modulating signal of known characteristics (preferably a constant-frequency sine wave having a frequency within the range of frequencies expected for the signal from source 10) is applied to modulator 11; and the precalibration procedure described above is repeated. In this instance, however, gain control 30 is now adjusted until the signal output from adder 26 has the same characteristics as the waveform of the reference modulating signal. This condition may be determined as by means of an oscilloscope or the like. The circuit of FIGURE 2 is then ready for use in connection with signals from source 10.

While the foregoing description has been concerned with embodiments of the invention which are contemplated to constitute the best mode of practicing the invention, it will be recognized that a number of modifications and other embodiments may be made without departing from the spirit and scope of the invention.

The invention claimed is:

1. In an apparatus for playing back a reproducible trace record of a carrier signal which has been pulse-duration modulated by means of an information signal and including a reproducible recording medium containing a trace record of the modulated signal, trace playback means, means to effect relative movement between said trace and said playbcak means, and means to demodulate the played-back signal, the improvement which comprises frequency-modulation detector means adapted to receive the played-back signal, means to differentiate the detector signal, and means to subtract the differentiated signal from the demodulated signal.

2. An apparatus as defined in claim 1 in which the subtracting means includes means to invert the phase of the detector signal, and an adder network to add the phase-inverted signal to the demodulated signal.

3. In an apparatus for reproducing a constant repetition rate carrier signal on a magnetic recording medium which is movable relative to recording and reproducing means, and wherein the carrier signal is pulse-duration modulated by an information signal, the improvement which comprises means to demodulate the reproduced modulated carrier to recover the information signal, a frequency-modulation detector responsive to variations in the repetition rate of the reproduced carrier signal, means to differentiate any signal from said detector, means to invert the phase of any differentiated detector signal, means to adjust the gain of the inverted signal relative to the demodulated signal, and means to algebraically add the inverted signal and the demodulated signal following the relative gain adjustment.

4. In an apparatus for reproducing a trace previously formed on a magnetic recording medium of a constant repetition rate carrier signal which has been pulse-duration modulated by means of an information signal and including means for reproducing and demodulating the trace, the improvement which comprises frequency-modulation detector means adapted to detect variations in the repetition rate of the reproduced carrier signal, means to differentiate the signal from said detector means, means to invert the phase of the differentiated signal, an adder network, means to adjust the gain of said inverted signal in response to the output of said adder network, means to supply the gain-adjusted inverted signal to said adder network, and means to supply said demodulated signal to said adder network.

References Cited in the file of this patent

UNITED STATES PATENTS

| | | |
|---|---|---|
| 2,685,079 | Hoeppner | July 27, 1954 |
| 2,721,989 | Gates et al. | Oct. 25, 1955 |
| 2,807,797 | Shoemaker | Sept. 24, 1957 |
| 2,826,750 | Grannemann | Mar. 11, 1958 |
| 2,827,622 | Guttwein | Mar. 18, 1958 |
| 2,839,615 | Sarratt | June 17, 1958 |

OTHER REFERENCES

"Compound Modulation Improves Data Storage" (Bentley), Control Engineering pages 104–105, May 1956.